(12) United States Patent
Enguent et al.

(10) Patent No.: US 9,934,460 B2
(45) Date of Patent: Apr. 3, 2018

(54) DUAL-MODE ANTI-COUNTERFEITING TAG

(71) Applicant: WISEKEY SEMICONDUCTORS, Meyreuil (FR)

(72) Inventors: Jean-Pierre Enguent, Aix en Provence (FR); Ghislain Boiron, Aix en Provence (FR); Pierre Pic, Ceyreste (FR); Tania Guidet, Aix en Provence (FR)

(73) Assignee: WISEKEY SEMICONDUCTORS, Meyreuil (FR)

( * ) Notice: Subject to any disclaimer, the term of this patent is extended or adjusted under 35 U.S.C. 154(b) by 0 days.

(21) Appl. No.: 15/312,689

(22) PCT Filed: May 18, 2015

(86) PCT No.: PCT/FR2015/051289
§ 371 (c)(1),
(2) Date: Nov. 21, 2016

(87) PCT Pub. No.: WO2015/177448
PCT Pub. Date: Nov. 26, 2015

(65) Prior Publication Data
US 2017/0193347 A1  Jul. 6, 2017

(30) Foreign Application Priority Data

May 21, 2014 (FR) ..................................... 14 54571
Dec. 1, 2014 (FR) ..................................... 14 61751

(51) Int. Cl.
*G06K 19/06* (2006.01)
*G06K 19/077* (2006.01)
*H04B 5/00* (2006.01)
*G06K 19/073* (2006.01)

(52) U.S. Cl.
CPC . *G06K 19/07798* (2013.01); *G06K 19/07381* (2013.01); *H04B 5/0062* (2013.01)

(58) Field of Classification Search
CPC ........ H01Q 1/38; H01Q 1/085; H01Q 1/2283; H01Q 1/243; H01Q 9/42; H03H 5/003; H03H 7/38; H03H 7/40; H04B 5/0062

USPC ......................................................... 235/492
See application file for complete search history.

(56) References Cited

U.S. PATENT DOCUMENTS

| | | | |
|---|---|---|---|
| 4,972,175 A | 11/1990 | MacPherson | |
| 6,181,287 B1 | 1/2001 | Beigel | |
| 6,307,194 B1 * | 10/2001 | Fitzgibbons | G01J 5/20 250/208.1 |
| 6,371,380 B1 | 4/2002 | Tanimura | |

(Continued)

OTHER PUBLICATIONS

Nov. 22, 2016 International Preliminary Report on Patentability issued in International Patent Application No. PCT/FR2015/051292.
Nov. 22, 2016 International Preliminary Report on Patentability issued in International Patent Application No. PCT/FR2015/051291.
Nov. 22, 2016 International Preliminary Report on Patentability issued in International Patent Application No. PCT/FR2015/051290.
Nov. 22, 2016 International Preliminary Report on Patentability issued in International Patent Application No. PCT/FR2015/051289.
Aug. 6, 2015 International Search Report issued in International Patent Application No. PCT/FR2015/051290.
Aug. 6, 2015 Written Opinion issued in International Patent Application No. PCT/FR2015/051290.
Aug. 10, 2015 International Search Report issued in International Patent Application No. PCT/FR2015/051289.

(Continued)

*Primary Examiner* — Thien M Le
(74) *Attorney, Agent, or Firm* — Oliff PLC

(57) ABSTRACT

An NFC tag includes a foldable substrate in the form of a tape; an antenna located at a first end of the tape; a capacitor connected to the antenna, located at the first end of the tape; an impedance, in particular a capacitor, located at a second end of the tape; and conductive tracks running along the tape to connect the impedance to the antenna.

14 Claims, 5 Drawing Sheets

(56) References Cited

U.S. PATENT DOCUMENTS

| | | | |
|---|---|---|---|
| 6,396,458 B1* | 5/2002 | Cockson | H01Q 1/22 |
| | | | 343/702 |
| 6,888,509 B2 | 5/2005 | Atherton | |
| 7,425,898 B2 | 9/2008 | Ryckman | |
| 7,898,422 B2 | 3/2011 | Puccini | |
| 8,854,213 B2 | 10/2014 | Adstedt et al. | |
| 9,617,038 B2 | 4/2017 | Yagishita et al. | |
| 2004/0104274 A1 | 6/2004 | Kotik et al. | |
| 2005/0012616 A1 | 1/2005 | Forster et al. | |
| 2006/0255953 A1 | 11/2006 | Lyon et al. | |
| 2007/0210173 A1* | 9/2007 | Nagel | G06K 7/0008 |
| | | | 235/492 |
| 2008/0252535 A1* | 10/2008 | Parsche | H01Q 1/085 |
| | | | 343/702 |
| 2009/0079568 A1 | 3/2009 | Forster et al. | |
| 2011/0105062 A1* | 5/2011 | Ridgeway | H01Q 1/38 |
| | | | 455/129 |
| 2012/0019385 A1 | 1/2012 | Brodzik et al. | |
| 2012/0199948 A1 | 8/2012 | Saisse | |
| 2012/0218110 A1 | 8/2012 | Forster | |
| 2013/0240631 A1 | 9/2013 | Huang | |
| 2014/0071015 A1* | 3/2014 | Zheng | A61N 1/37252 |
| | | | 343/860 |
| 2014/0375523 A1* | 12/2014 | Li | H01Q 1/242 |
| | | | 343/861 |
| 2016/0078215 A1 | 3/2016 | Robshaw et al. | |

OTHER PUBLICATIONS

Aug. 10, 2015 Written Opinion issued in International Patent Application No. PCT/FR2015/051289.
Aug. 13, 2015 International Search Report issued in International Patent Application No. PCT/FR2015/051292.
Aug. 13, 2015 Written Opinion issued in International Patent Application No. PCT/FR2015/051292.
Aug. 11, 2015 International Search Report issued in International Patent Application No. PCT/FR2015/051291.
Aug. 11, 2015 Written Opinion issued in International Patent Application No. PCT/FR2015/051291.
U.S. Appl. No. 15/312,776, filed Nov. 21, 2016.
U.S. Appl. No. 15/312,806, filed Nov. 21, 2016.
U.S. Appl. No. 15/312,685, filed Nov. 21, 2016.
Nov. 14, 2017 Office Action issued in U.S. Appl. No. 15/312,685.
Nov. 15, 2017 Office Action issued in U.S. Appl. No. 15/312,806.

* cited by examiner

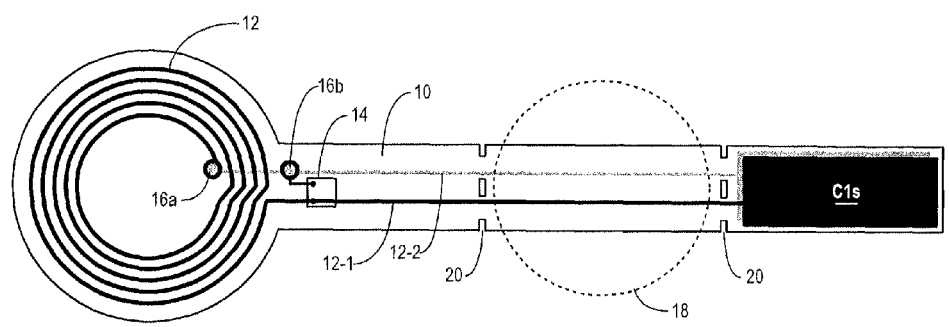
Fig 1
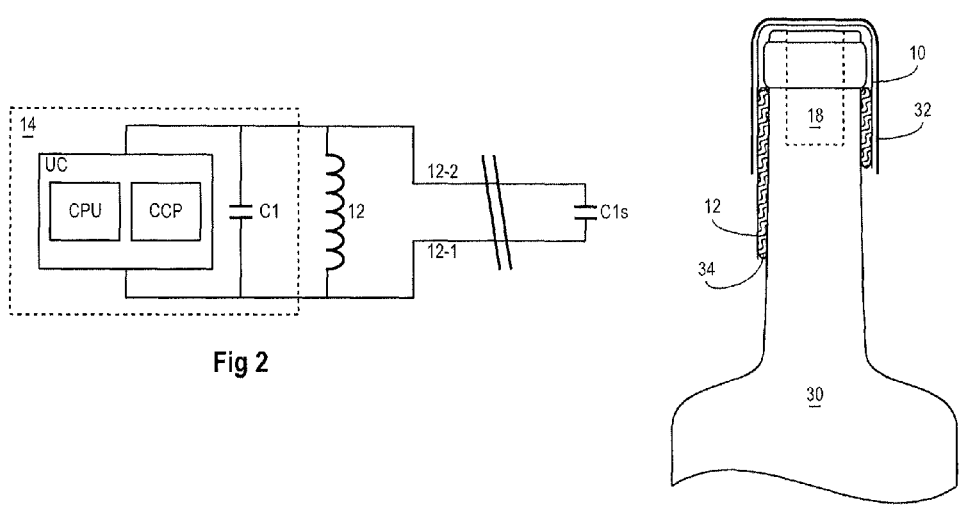
Fig 2
Fig 3
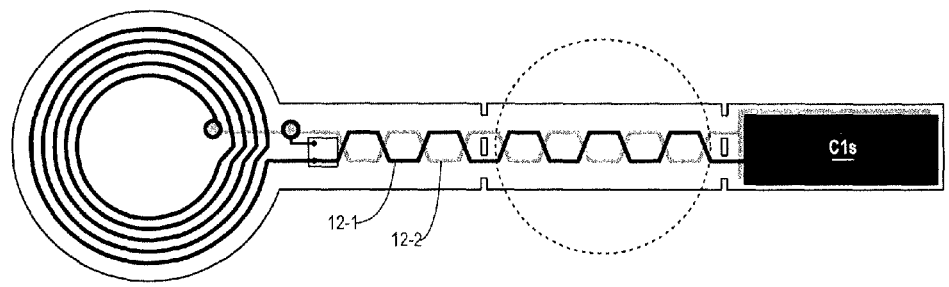
Fig 4

Fig 7
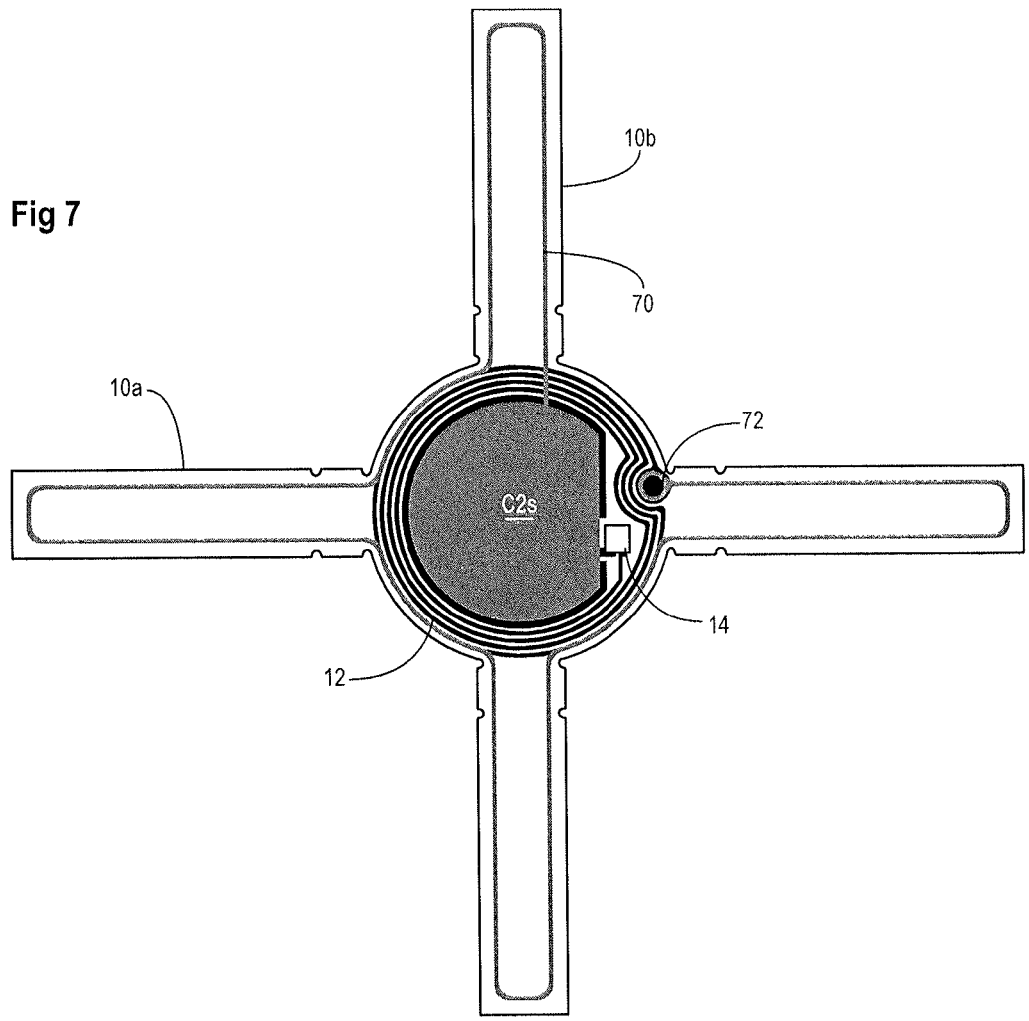
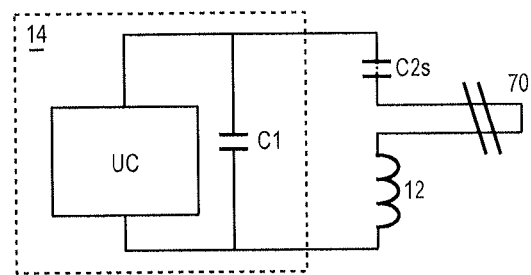
Fig 8

DUAL-MODE ANTI-COUNTERFEITING TAG

FIELD

The invention relates to near field magnetically coupled contactless identification devices, e.g. NFC, ISO 14443, or ISO 15693 devices, and more specifically to an anti-counterfeiting contactless device for ensuring authenticity of the contents of a bottle.

BACKGROUND

U.S. Pat. No. 7,898,422 describes an anti-counterfeiting NFC device integrated in a wine bottle cork. The device is arranged so that the insertion of a corkscrew damages the antenna or the control microcircuit.

When the device is intact, it can be interrogated remotely by an NFC reader to retrieve information on the product, and also to confirm the authenticity of the information. When the cork has been removed, the NFC device is damaged, so that the cork cannot be reused to authenticate the content of a new bottle.

US patent application 2005-0012616 discloses an RFID tag having a sacrificial antenna designed to be broken at the opening of a container, for example. The sacrificial antenna enables reading the tag in an extended distance range. When the sacrificial antenna is broken, the tag can continue to operate in an antenna-less mode with a limited reading distance range.

US patent application 2007-0210173 describes an RFID tag in two parts, each of which includes an independent RFID component having cryptographic functions. A tag rupture renders one of the two RFID components inoperative. A reader is programmed to signal that the tag is intact if it manages to negotiate authentication with both RFID components of the tag. The tag is considered as damaged if only one authentication can be negotiated.

SUMMARY

In general, a near field magnetically coupled anti-counterfeiting tag is provided, comprising a control microcircuit configured to implement a basic function and a cryptographic function; a sacrificial conductive track arranged across a sacrificial area of the tag; and a circuit for detecting continuity of the sacrificial track, cooperating with the microcircuit to implement the basic function without implementing the cryptographic function when the sacrificial track is broken.

The microcircuit may be a standard microcircuit comprising a programmable digital input/output pin, the sacrificial track being connected between the input/output pin and a power supply pin of the microcircuit, the microcircuit being programmed to test the state of the input/output pin to determine the implementation of the cryptographic function.

Alternatively, the tag may include an antenna circuit configured to ensure a continuity detection function, the sacrificial track being connected to the antenna circuit so that its rupture shifts the frequency tuning of the antenna circuit, the offset in the tuning frequency being selected such that the supply power received by the microcircuit is lowered to a level insufficient for implementing the cryptographic function, yet sufficient for implementing the basic function.

The tag may include a compliant substrate tape; an antenna included in the antenna circuit; a capacitor connected to the antenna circuit; a sacrificial impedance; and the sacrificial track running along the tape to connect the sacrificial impedance to the antenna circuit.

The tag may include two metal surfaces facing each other on opposite sides of the substrate in a region of interest of the substrate, configured such that a piercing of the region of interest causes a permanent short circuit between the two surfaces; and a circuit configured to detect a short circuit between the two metal surfaces.

Alternatively, the tag may include a sacrificial structure including a conductive track connecting the sacrificial impedance to the antenna circuit, the track configured in meanders occupying a region of interest of the substrate so that a piercing of the area of interest severs the conducting track.

The antenna may include turns wound in a ring around a central area of the tape; the sacrificial impedance may be arranged at a first end of the tape; and the sacrificial track may include a loop extending to the second end of the tape.

The tag may include several tapes intersecting at the antenna area, the sacrificial track forming a loop in each tape segment extending from the antenna, except the tape segment supporting the sacrificial impedance.

The tag may include several tapes intersecting at the antenna area, the sacrificial track forming a loop in the tape segment opposite the one supporting the sacrificial impedance.

A container may be provided comprising a cap and a tag of the abovementioned type, wherein the substrate region bearing the antenna has a smaller diameter than the cap, and is fixed by gluing on the container and cap, so that the antenna is centered over cap.

BRIEF DESCRIPTION OF DRAWINGS

Other advantages and features will become more clearly apparent from the following description of particular embodiments of the invention provided for exemplary purposes only and represented in the appended drawings, in which:

FIG. 1 shows an embodiment of an anti-counterfeiting NFC tag for a bottle;

FIG. 2 is an equivalent electrical block diagram of the device of FIG. 1;

FIG. 3 shows a use case of the device of FIG. 1 on a wine bottle;

FIG. 4 shows an alternative of the device of FIG. 1;

FIG. 7 shows another embodiment of an anti-counterfeiting NFC tag for a bottle;

FIG. 8 is an equivalent electrical block diagram of the device of FIG. 7;

DESCRIPTION OF EMBODIMENTS

Figure 5:
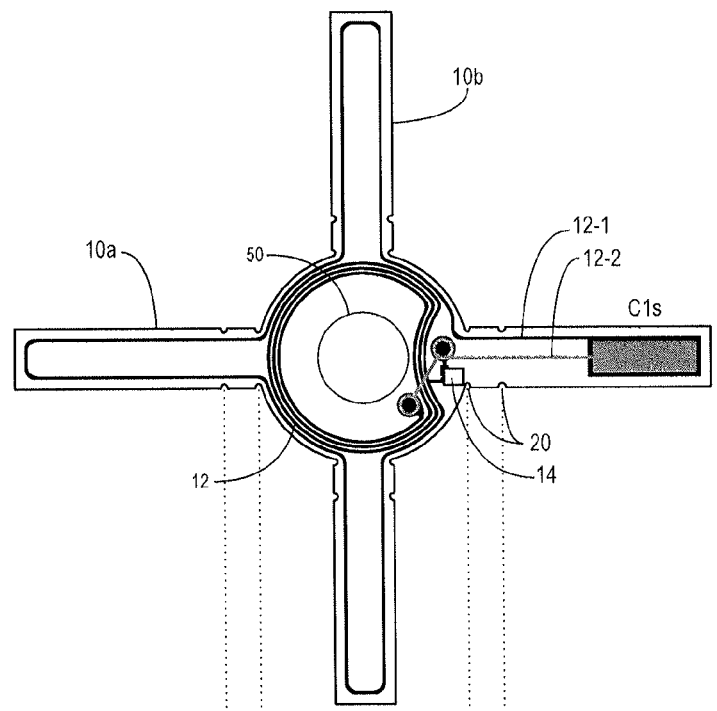
FIG. 5 shows another embodiment of an anti-counterfeiting NFC tag for a bottle.

In the context of the aforementioned U.S. Pat. No. 7,898,422, once the bottle has been opened, the NFC device becomes silent. However, the user may wish to consult the information again, for example to share it with a friend, or visit the producer's website to order new bottles.

A tag of the type described in US patent application 2005-0012616 does not differentiate the sealed or open state of a container in the information returned by the tag. Indeed, the information returned is the same, whatever the state of the sacrificial antenna, provided the tag reader can supply the tag in its antenna-less mode.

A double tag of the type described in the aforementioned US patent application 2007-0210173 requires two independent NFC circuits and two different steps for attaching the tag to the object to protect, which increases the manufacturing cost. Furthermore, each NFC circuit, being independent, preserves its full functionality when interrogated by the tag reader.

Contactless anti-counterfeiting devices, for example of NFC type, are provided hereinafter for containers, in particular bottles or vials, in the form of tags that are inexpensive to manufacture. In addition, the tags are designed to allow authentication when intact, and mere reading and transmission of information when they are broken following the opening of the container. Indeed, when the container is opened, the user may simply wish to read the information available in the contactless device without performing an authentication.

FIG. 1 illustrates a first embodiment of an anti-counterfeiting NFC tag which will be referred to as "dual mode". The tag is in the form of a tape 10 of insulating material serving as a substrate to form conductive tracks according to common manufacturing techniques of RFID tags. One end of the tape is enlarged to accommodate an NFC antenna 12 formed of several turns of a conductive track.

A microcircuit 14 is mounted near the connection between the tape 10 and the antenna 12 and is connected to the antenna terminals by a track 12-1 on the same side as the antenna, and a track 12-2 on the opposite side, joining the end of the inner turn of the antenna through a via 16a. A via 16b couples the microcircuit 14 to the track 12-2.

The microcircuit 14 is flip-chip assembled or fixed with a conductive adhesive. The microcircuit integrates NFC device management functions. Since the device can provide an authentication function, it is an active device, that is to say, the microcircuit integrates a microcontroller and cryptographic functions. The microcircuit then draws its power from the energy supplied to the antenna by an NFC reader, which can be a smartphone, tablet, watch, etc. provided with an NFC interface.

Tracks 12-1 and 12-2 extend to the opposite end of the tape, where they are respectively connected to two conductive surfaces formed on both sides of the tape. These opposing conductive surfaces form a sacrificial capacitor $C1s$.

The device is designed to be secured to a container, e.g. a bottle, so that the central portion of the tape is placed across a sealing element 18 of the container, for example a cork. It is desired that the tape breaks while also severing the tracks 12-1 and 12-2 when the bottle is opened, that is to say when the cork 18 is pulled. For this purpose, the bond between the tape and the container may be designed to have a rupture strength greater than that of the tape. A high bonding strength may be obtained with glue, and the required rupture strength may be ensured by gluing the tape over a sufficient surface area.

The rupture strength of the tape may also be reduced by providing breaking points 20 near the cork, as shown. Preferably, these breaking points are located at the edge of the bonding area of the tape, which causes a rupture-promoting stress.

The tape may be bound to the container by the face bearing the majority of the conductive tracks. The adhesive force of the tracks to the container is generally higher than the adhesive force of the tracks to the tape. As a result, any attempt to remove the tag causes tearing of the conductive tracks, which remain stuck to the container.

The tracks are usually aluminum, making it difficult to repair severed tracks by welding or brazing due to the insulating oxide layer that forms on aluminum upon exposure to air.

FIG. 2 is an equivalent electrical diagram of the device of FIG. 1. The microcircuit 14 may include a dedicated microcontroller UC implementing the logic and analog functions of the microcircuit, including supplying power to the circuit from the field supplied to the antenna by an NFC reader, demodulation of signals transmitted by the reader, modulation of the impedance of the antenna for transmitting signals to the reader, and generation of secure keys to authenticate the transmitted information.

The microcircuit further includes a capacitor $C1$ connected across the antenna 12. The tracks 12-1 and 12-2 connect the sacrificial capacitor $C1s$ in parallel with the capacitor $C1$. The antenna 12 and the capacitors $C1$ and $C1s$ form an antenna circuit whose tuning frequency is determined by the sum of the values of the capacitors $C1$ and $C1s$, and by the inductance of the antenna. These values are chosen to tune the antenna circuit to a typical nominal frequency chosen for good interoperability between standards compliant devices, e.g. 14 MHz.

When the sacrificial capacitor $C1s$ is disconnected from the antenna circuit after severance of the tape, the antenna circuit is tuned to a frequency offset above the nominal frequency, e.g. 17 MHz, defined solely by the capacitor $C1$ and the inductance of the antenna. As a result, the device may still be powered by the field of a reader, but the transmitted power is lower.

To perform authentication operations, the microcontroller UC of microcircuit 14 has cryptographic functions. The microcontroller may include a general purpose processor CPU assisted by a cryptographic coprocessor CCP.

Mere reading of information stored in the microcircuit and transmission thereof by the antenna does not solicit the CPU very much and requires little electrical power. The coprocessor CCP is then not used. The current consumption may be less than 1 mA. This power level can be provided even by an out of tune antenna circuit.

A cryptographic operation, however, solicits both the CPU and the coprocessor CCP, and may consume a current of several milliamperes. This power level cannot be provided if the antenna circuit is too severely out of tune, even when touching the tag with the reader.

With these elements, assuming that $C1+C1s$ is the value required to obtain an antenna circuit tuned to the nominal frequency, the value $C1$ is chosen so that, in the absence of capacitor $C1s$, the antenna circuit is tuned enough to produce the power required for mere reading and transmission of information, but not enough to produce the power required by a cryptographic operation.

In an example where the nominal frequency is 14 MHz, the desired operation is obtained when the offset tuning frequency is chosen near 17 MHz in a given technology.

The microcircuit may then be programmed to systematically start with the production of information and end with the cryptographic operations. Breaking the tape disconnects the capacitor C1s from the antenna circuit, causing the tuning shift of the antenna circuit. In this case, when the microcircuit starts the cryptographic operations, the supply voltage collapses, causing a reset of the microcircuit. The microcircuit reboots and starts the same cycle again.

FIG. 3 shows an exemplary use case of an anti-counterfeiting NFC tag of the type of FIG. 1 on a bottle of wine 30. (For clarity of the figure, the spaces between elements have been exaggeratedly enlarged.) The cork 18 is flush with the upper end of the bottle neck. The central part of the tape 10 covers the cork 18 horizontally. The ends of the tape are folded down vertically to fit the sides of the neck, and are fixed to the neck by a layer of glue 34. The tape may be flexible enough to allow folding over the top end of the neck and fit the radius of the neck. In this case, the antenna is preferably planar.

A bottle of wine is usually provided with a protective cap 32 that covers the cork and the upper end of the neck. As shown, the cap may also cover the tape 10. In this case, as the cap is often metallic, it is preferable that the antenna 12 is outside the cap so that it is exposed to electromagnetic fields. The length of the tape 10 is chosen accordingly.

The NFC tag thus laid out can be read by a customer using their NFC smartphone or other NFC reader. In particular, when the tag is intact, they may proceed with an authentication using a secure key available in the tag to confirm that the product conforms to the information provided by the tag via an authentication server and a dedicated application. They may also, using the same application or a generic application, consult the product's features, even when the anti-counterfeiting tag is broken, including the type of information that may appear on a paper label of the bottle. Several bottles of a same batch may have tags sharing the same identifier or key.

The tracks 12-1, 12-2 of FIG. 1 can be relatively long and form parasitic antennas that capture spurious electromagnetic fields. When the tape 10 is wrapped in a metal cap (FIG. 3), the cap offers protection from these magnetic fields. In other situations, the cap may be transparent to the fields, or be absent.

FIG. 4 illustrates an alternative of the tag of FIG. 1, less sensitive to parasitic fields. The pair of tracks 12-1, 12-2 is configured to form a twisted pair. For this purpose, for example, the tracks 12-1 and 12-2 are not actually "twisted", but sinuous in opposite phases.

Certain wine connoisseurs may wish to keep the cork, which bears the main information relating to the wine. In this case, it would be convenient that the active part of the NFC tag remains on the cork, so that the connoisseur can get more detailed information about wine by reading the information contained in the tag, using a smartphone for example.

FIG. 5 shows an embodiment of an anti-counterfeiting tag dedicated to this use. The NFC tag is designed so that its active part, namely the antenna 12 and the microcircuit 14, remains fixed on the upper end of the cork, and that this active part allows reading information without authentication once the cork is extracted.

The tag here includes a substrate in the form of two crossed tapes 10a and 10b. The antenna 12 is arranged at the intersection of the two tapes, and includes turns wound in a ring around a sufficiently large central area for allowing a corkscrew to penetrate without damaging the antenna. As shown, the central area of the substrate may include an opening 50 to facilitate penetration of the corkscrew and limit the deformation of the substrate. The outer diameters of the antenna 12 and the annular region of the supporting substrate are at most equal to the diameter of the cork.

The tape segments or wings extending radially from the antenna are designed to separate from the central area upon extraction of the cork, and may include for this purpose breaking points 20 in the vicinity of the outer diameter of the annular region bearing the antenna. The microcircuit 14 and its connection tracks to the antenna circuit are arranged within the annular region of the substrate so that they do not remain on the tape segments when the cork is extracted. The sacrificial capacitor C1s is arranged at the distal end of one of the wings, here the right wing that is part of tape 10a.

This structure is similar to that of FIG. 1, considering the antenna and the right wing bearing the sacrificial capacitor C1s. The additional wings render access to the cork more difficult without breaking the tag. As shown, the track 12-1 may form a loop in each of the three additional wings before joining the corresponding pin of the microcircuit 14, so that the track is severed when any of the wings is broken.

Figure 6:
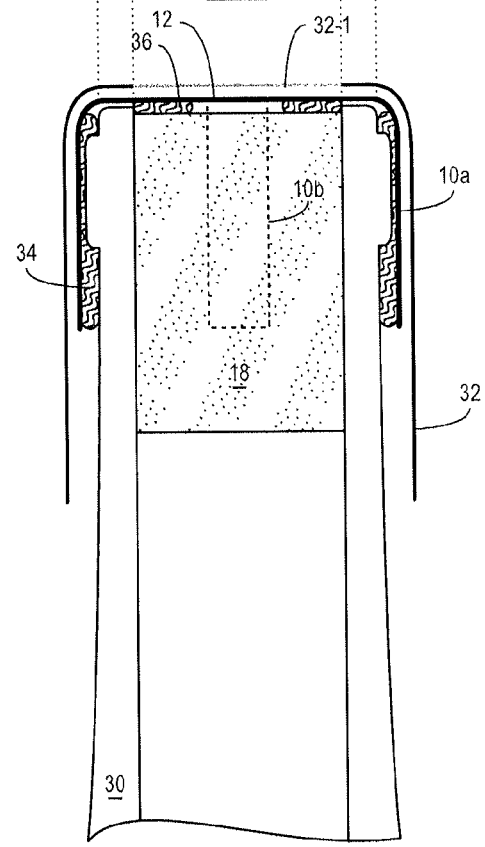
FIG. 6 shows a use case of the device of FIG. 5 on a wine bottle.

FIG. 6 shows an exemplary use case of an anti-counterfeiting NFC tag of the type of FIG. 5 on a bottle of wine 30. (For clarity of the figure, the spaces between elements have been exaggeratedly enlarged.) The cork 18 is flush with the top end of the bottle neck or is slightly recessed. The central annular part of the substrate carrying the antenna 12 is adjusted on the upper end of the cork 18 and is secured thereto by a layer of glue 36. The wings of tapes 10a, 10b are folded down vertically to fit the sides of the neck, and are fixed to the neck by a layer of glue 34.

To open the bottle, a corkscrew may be introduced through the central opening 50 of the tag without damaging the antenna 12. The extraction of the cork 18 breaks the wings, and therefore removes the sacrificial capacitor C1s from the antenna circuit. The active part of the tag, without the sacrificial capacitor C1s, remains fixed on the upper end of the cork. This active part remains operational for a simple reading of information, but not for performing an authentication. Authentication is possible only if the tag is intact, that is to say, fixed on a unopened bottle.

A protective cap 32 generally envelops the upper end of the neck, including the wings of tapes 10a, 10b. If the cap is metallic, it preferably includes a portion 32-1 facing the antenna, shown in gray, that is permeable to magnetic field. In order to promote the passage of field lines at the periphery of the antenna, the portion 32-1 preferably has a larger diameter than the antenna. It shall be noted that this embodiment provides a discreet NFC tag, which does not alter the appearance of the bottle, which is something that some producers or manufacturers may desire.

The tag of FIG. 5 has been shown by way of example in the form of two crossed tapes 10a and 10b forming four radial wings. The number of wings may be arbitrary, but preferably at least equal to two. All wings do not necessarily bear conductive track—for instance, a tag may be provided with a first pair of opposite wings bearing tracks, and a second pair of opposite wings without tracks. The number of wings may be odd.

The anti-counterfeiting NFC tags of FIGS. 1 and 5 are effective to identify bottles that have been opened and potentially re-filled with a product of doubtful origin. However, they do not detect the removal or replacement of content using a syringe, for example using the Coravin™ process where the cork is pierced with a syringe and the content is extracted while injecting an inert gas into the bottle. Such a technique would leave the tag intact.

FIG. 7 illustrates an embodiment of an NFC tag that can detect a cork piercing attempt. The tag is made here on a substrate of same cross-shape as the tag of FIG. 5. The central portion, housing the antenna 12, however, has a larger diameter than the cork. The antenna 12 is wound in a ring in the space between the edge of the neck and the cork, thus leaving a central region of the size of the cork, which central region forms a region of interest to protect. This central region is used to form a sacrificial capacitor C2s. The capacitor C2s is formed by two metal surfaces facing each other, one formed on the upper face of the substrate (in gray) and the other on the opposite face of the substrate (in black). The metal surfaces are not shown the same size in order to distinguish them in the figure—in practice they are the same size and fill the region of interest corresponding to the top of the cork. The microcircuit 14 is preferably also arranged in this zone.

The antenna 12 and the sacrificial capacitor C2s are connected in series in this embodiment. The lower surface of the capacitor (in black) is directly connected to a first pin of the microcircuit 14. A conductive track 70 connected to the upper surface of the capacitor (gray) includes a loop extending into each tape segment or wing extending radially from the central zone. The last loop crosses the substrate through a via 72 and joins the outer end of the antenna 12. The inner end of the antenna is connected to the second pin of the microcircuit 14.

A tag of the type of FIG. 7 may be mounted on a bottle in the manner shown in FIG. 6. The central area of the tag may be glued over its entire surface on the cork. Any attempt to access the cork then results in the piercing of the two metallic surfaces of the sacrificial capacitor C2s. When piercing, the plastic substrate between the two metal surfaces is compressed permanently, while the metal of the upper surface stretches, following the movement of the piercing object (a needle or corkscrew), and reaches the lower surface. The lower surface, since it lies against a glue layer that is generally harder than the substrate, deforms less than the upper surface. This results in a crimping of the deformed region of the upper metal surface with the lower metal surface, so that the two surfaces of the capacitor become permanently short-circuited, even upon extraction of the piercing object. This short circuit also occurs when the metal surfaces of the capacitor are aluminum, because aluminum is wrought in an inert atmosphere to prevent oxide formation, and the areas put in contact of both surfaces are devoid of oxide since they are protected by the substrate.

This short-circuit of the sacrificial capacitor C2s may be used to detune the antenna circuit so that the NFC device operates in a degraded mode, i.e. so that it offers the reading functions, but not the cryptographic functions.

The extraction of the cork moreover severs the wings and the conductive track 70. This severance disconnects the antenna 12 from the microcircuit, so that the NFC device becomes inoperative. The tag is then silent.

FIG. 8 is an equivalent circuit diagram of the device of FIG. 7. As previously indicated, the sacrificial capacitor C2s and the antenna 12 are connected in series between the two pins of the microcircuit 14. The antenna circuit thus includes the capacitor C1 of the microcircuit connected in series with the capacitor C2s and the inductance of the antenna 12. When the capacitor C2s is short-circuited, the antenna 12 is directly connected across the capacitor C1.

Given these two configurations, the component values are selected to achieve tuning to the desired nominal frequency when the capacitor C2s is integral, and a tuning offset placing the device in a degraded mode when the capacitor C2s is shorted. The value of the sacrificial capacitor C2s is determined by the cork diameter and the thickness of the substrate.

With a PET substrate of 38 microns typically used for RFID applications and the diameter of a wine bottle cork (21 mm), a capacitance of the order of 116 pF is obtained. Providing nine turns for the antenna and a value of 104 pF for capacitor C1, a tuning frequency on the order of 15 MHz is obtained, which is sufficiently close to the desired nominal frequency of 14 MHz to ensure all functions (reading and cryptography). When the capacitor C2s is shorted, a tuning frequency of approximately 11 MHz is obtained, just sufficient to ensure the reading functions.

Figure 9:
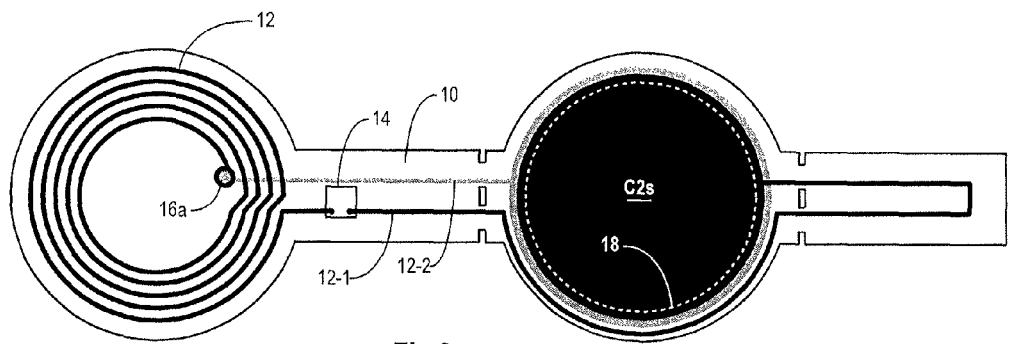
FIG. 9 shows an alternative of the device of FIG. 7.

FIG. 9 illustrates an embodiment of an NFC tag that can detect a cork piercing attempt, in the same format as the tag of FIG. 1, i.e. with an antenna 12 offset to an end of the tape. The central portion of the tape that covers the cork 18 carries the metal surfaces forming the sacrificial capacitor C2s. The microcircuit 14 is mounted in series in the track 12-1 that extends through the tape. This track further connects to the upper metal surface of the capacitor C2s after forming a loop toward the distal end of the tape. The lower metal surface of the capacitor is connected to the track 12-2.

This embodiment offers greater latitude to realize the antenna 12 than the embodiment of FIG. 7, and it allows covering the cork integrally with metal surfaces. It may however be less suitable in cases where it is desired to integrally hide the tag under the cap.

Figure 10:
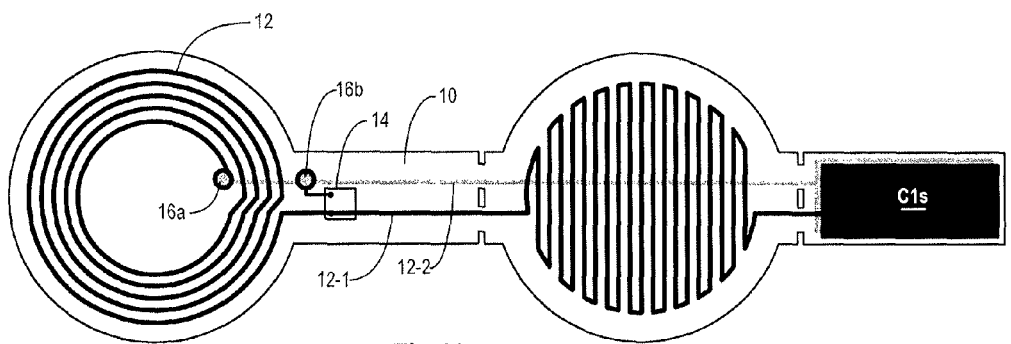
FIG. 10 shows another embodiment of an anti-counterfeiting NFC tag for a bottle.

FIG. 10 illustrates an alternative similar to the tag of FIG. 1, which can also detect piercing attempts. In contrast to the tag of FIG. 1, one of the connection tracks of the sacrificial capacitor C1s, here track 12-1, has a compact meander-like configuration occupying the entire surface area of the region of interest to protect. The pitch of the meanders is preferably less than the diameter of the needle that could be used for piercing, so that the insertion of the needle severs the track in at least one location. If the track 12-1 cannot be configured with a small enough pitch, the second track 12-2, on the other side of the substrate, may be configured into complementary meanders, such that segments of track 12-2 are interleaved with segments of track 12-1, virtually dividing the pitch by two.

This tag will operate in degraded mode, allowing only reading of information, both when the cork is removed (breaking the tape and the tracks 12-1 and 12-2), and when the cork is pierced (breaking a track segment in the protected area).

The configuration of FIG. 10 can be transposed to the cross configuration of FIG. 5 or 7 if a discreet tag is desired that can remain on the extracted cork in order to read information.

Many variations and modifications of the embodiments described herein will be apparent to the skilled person. To achieve a controlled tuning offset of the antenna circuit upon tag rupture, a sacrificial capacitor (C1s, C2s) was disclosed as a preferred embodiment—equivalent techniques may of course be used leading to a tuning offset of the antenna circuit, for example by using a sacrificial inductor or other sacrificial impedance in place of the sacrificial capacitor.

Controlling the component values of the antenna circuit to achieve the desired tuning offset, i.e. for providing enough power supply, when the tag is broken, for the reading functions but insufficient power supply for the cryptographic functions, may be difficult under certain conditions. A feature of the dual-mode devices disclosed so far is that they can use an off-the-shelf microcircuit 14 having only two undifferentiated pins, which could in certain circumstances simplify the industrialization processes and reduce costs.

Inside Secure sells NFC device management microcircuits under the name VaultIC™ 152, which have five pins—two pins to connect the antenna, a ground pin GND, a programmable digital input/output pin IO, and a pin VCC that may be used to power the microcircuit from a battery or to power other components from the energy gathered from the antenna. Such a microcircuit may be used in a dual-mode tag structure with fewer constraints on the achievement of the two modes of operation in large-scale manufacturing.

Figure 11:
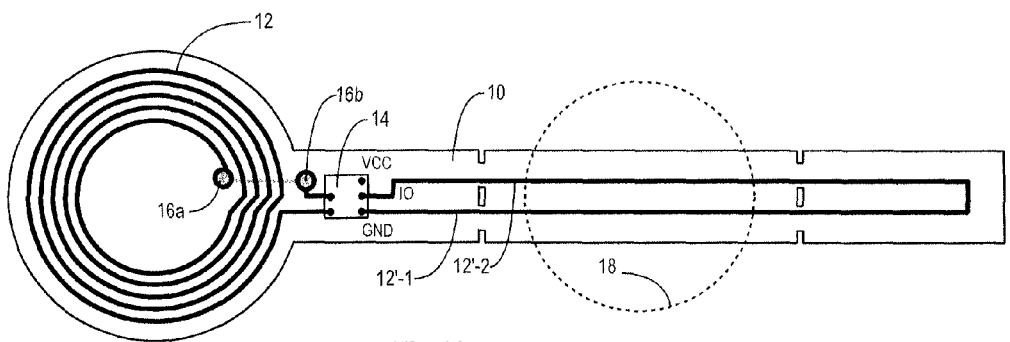
FIG. 11 shows another embodiment of an anti-counterfeiting NFC tag for a bottle.

FIG. 11 schematically shows such an NFC tag structure, offering complete functionality when it is undamaged, and limited functionality without encryption when it is damaged. The microcircuit 14 thus includes five pins, two of which are connected to the antenna 12 in a configuration similar to that of FIG. 1. The conductive tracks 12-1 and 12-2 of the previous figures, here denoted 12'-1 and 12'-2 are separate from the antenna track 12 and are respectively connected to one of the power supply pins, e.g. the ground pin GND, and the input/output pin IO of the microcircuit 14. The tracks 12'-1 and 12'-2 may be on the same face of the tape 10 and are connected to one another at the distal end of the tape to form a loop that crosses the sacrificial area, corresponding for instance to the location of the cork 18.

In some VaultIC microcircuits, the input/output pin IO is pulled to the supply line VCC by a resistor, whereby its logic level is high when it is not connected. In the configuration of FIG. 11, the IO pin is held at a logic low level by the loop 12'-1, 12'-2. When the loop is broken, the IO pin goes high.

Thus, the microcircuit 14 may be programmed to test the level of the IO pin at each reading. When the level is low, i.e. when the tag is undamaged, the program in the microcircuit may be designed to run all expected operations, namely the production of plaintext information and the execution of an authentication operation using cryptography. When the level is high, i.e. when the loop 12'-1, 12'-2 is open, the program of the microcircuit may be designed to produce the plaintext information but omit the authentication operation.

One of the tracks 12'-1, 12'-2 may be meander-like as in FIG. 10, the other being placed on the opposite face of the tape. This allows detecting the severance of the track by removal of the tag or piercing of the cork, causing the authentication step to be skipped.

In other applications, the input/output pin IO of the microcircuit 14 may be used to detect a short-circuit rather than an open circuit. Thus, in a configuration similar to that shown in FIGS. 7 and 9, the IO pin may be connected to one of the metal surfaces of the sacrificial capacitor C2s, the other metal surface being connected to ground. A piercing of the cork is then detectable through the permanent short-circuit between the metal surfaces forming the sacrificial capacitor C2s. Then, in the absence of piercing, the IO pin is high. When the capacitor is pierced, it is shorted and pulls the IO pin to ground. In this case, the microcircuit reacts to the states of the IO pin with inverted logic compared to the previous applications.

Figure 12:
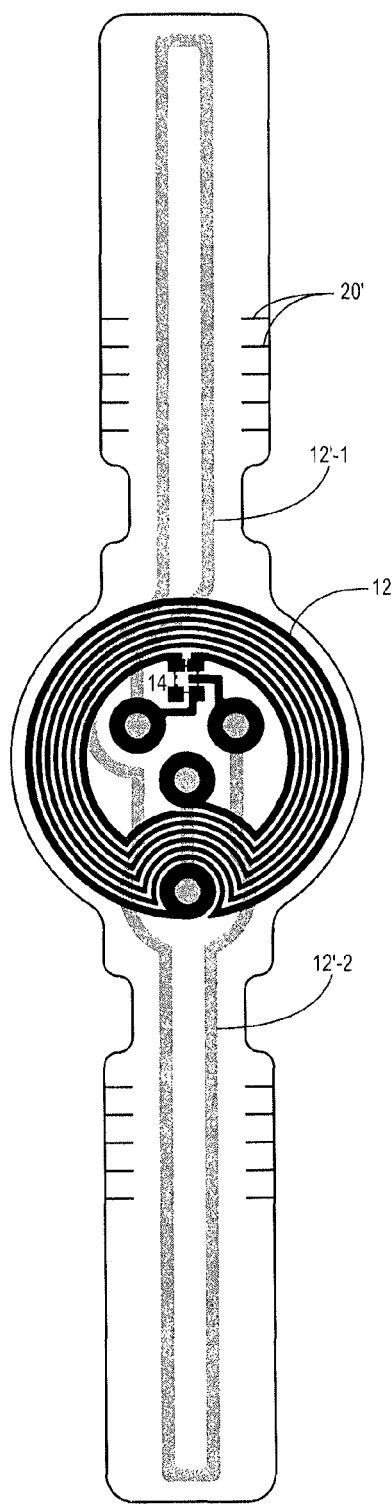
FIGS. 12 and 13 show an alternative of the tag of FIG. 11 in two forms that are industrially feasible with current technologies.

FIG. 12 shows an alternative of the tag of FIG. 11. The antenna 12 is arranged in the center of the tape so that it is centered over the cork when the tag is in place on the neck of a bottle. The microcircuit 14 is located inside the antenna winding. The two wings on either side of the antenna are crossed by the loop 12'-1, 12'-2, so that the severance of one of the wings is sufficient to interrupt the loop. Each of the wings may have, on each of its edges close to the central portion, several transverse cuts 20' serving as breaking points.

Such a tag may be attached to the bottle only by its wings. When the bottle is opened, the wings will break when the user cuts and removes the cap covering the cork and tag. The central portion of the tag remains usable without the authentication function to share the information it contains.

This FIG. 12 corresponds to an actual operational prototype produced with an aluminum track technology. The diameter of the central portion of the tag is 25 mm, which is the diameter of the neck of a wine bottle. This technology, in its current state, produces relatively large vias that may occupy a large surface area of the central region of the antenna, which may be an obstacle to manufacturing tags according to FIGS. 5 and 7, since those tags require an uncluttered area at the center of the antenna.

Figure 13:
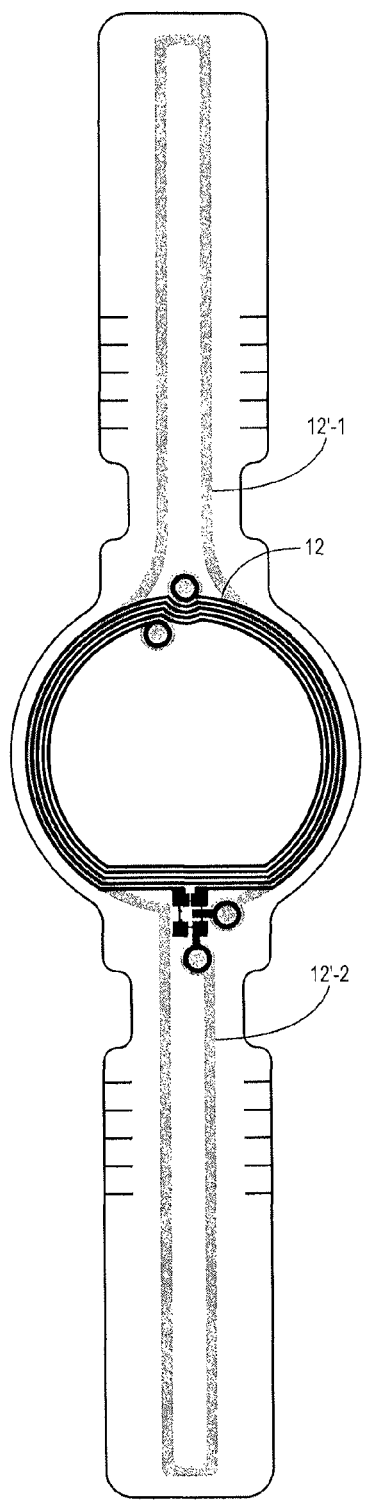

FIG. 13 shows a tag prototype of the type of FIG. 12 made with a copper track technology. This technology can produce tracks and vias with smaller features than aluminum technologies, whereby a wide central area may be released, making it easier to manufacture tags of the type of FIGS. 5 and 7.

Tags with offset antennas (particularly those of FIGS. 1 and 11) may also be used on containers with metal closure members, by providing the rear side of the tag at the antenna level with an electromagnetic insulation layer such as ferrite.

From FIG. 11, a continuity detection technique has been disclosed using the IO pin of the microcircuit 14, this detection technique essentially including the observation of a permanent change in the voltage level of the IO pin.

To counter some tag repair options, the microcircuit may be designed to emit a pseudo-random logic sequence on the IO pin. The sacrificial loop may then be connected between the pin IO and a second input/output pin programmed to compare the incoming logic sequence to the sequence transmitted on pin IO. If the microcircuit detects that the incoming sequence differs from the transmitted sequence, it can switch into the mode with restricted functionality.

In practice, the realization of this type of detection requires no additional circuitry. Indeed, microcircuits used in this type of product are usually provided with an "active shield" protecting the microcircuits from intrusion, as described in U.S. Pat. No. 8,296,845, for example. An active shield generally includes a dense network of conductive tracks realized on the last metal level of the chip. The tracks receive on one end a logic pseudo-random sequence, and circuitry collects the signals at the other ends of the tracks to compare them to the expected signal. The microcircuit may be programmed to take preventive measures when a signal mismatch is detected.

The microcircuit may be readily modified in this case to extend one of the active shield tracks through the input/output pins and the sacrificial loop. The interruption of the sacrificial loop then has the same effect as severing the active shield track.

What is claimed is:

1. A near field magnetically coupled device comprising:
   a foldable substrate in the form of a tape having a first end and a second end, the first end and the second end being located on either side of a sacrificial area;
   an antenna located at the first end of the tape;
   a capacitor located at the first end of the tape, the capacitor being connected for influencing a tuning frequency of the antenna;

a sacrificial impedance located at the second end of the tape, the sacrificial impedance being connected for influencing the tuning frequency of the antenna; and conductive tracks running along the tape, across the sacrificial area, to connect the sacrificial impedance to the antenna, wherein a rupture of the sacrificial area disconnects the sacrificial impedance and modifies the tuning frequency of the antenna.

2. The device of claim 1, wherein the sacrificial impedance defines with the antenna and the capacitor a nominal tuning frequency, the device further comprising a control microcircuit connected to be power-supplied from the antenna, a value of the capacitor being chosen so that, in the absence of the sacrificial impedance, the microcircuit power supply is insufficient to provide a full functionality, but sufficient to provide a limited functionality, when the device is powered by a field at the nominal frequency.

3. The device of claim 2, wherein the full functionality of the microcircuit includes information reading functions and cryptographic functions, and the limited functionality of the microcircuit is devoid of the cryptographic functions.

4. The device of claim 3, wherein the tape includes breaking points in a central part of the tape.

5. The device of claim 3, wherein the conductive connecting the sacrificial impedance and the antenna are located on either side of the tape, and are configured as a twisted pair.

6. A container comprising:
a closure member;
a tape placed across the closure member and glued to the container, the tape surface area bonded to the container being chosen so that the rupture strength of the bonding is greater than the rupture strength of the tape, whereby withdrawal of the closure member causes a rupture of the tape in a sacrificial area; and
included on the tape, near field magnetically coupled device comprising:
an antenna at a first end of the tape;
a capacitor located at the first end of the tape and connected for influencing a tuning frequency of the antenna;
a sacrificial impedance located at the second end of the tape and connected for influencing the tuning frequency of the antenna; and
conductive tracks running along the tape, and across the sacrificial area, to connect the impedance to the antenna,
wherein a rupture of the sacrificial area disconnects the sacrificial impedance and modifies the tuning frequency of the antenna.

7. The container of claim 6, wherein the tape includes break points adjacent the closure member.

8. The container of claim 6, wherein conductive tracks forming the antenna and interconnecting the components of the near field magnetically coupled device are located on the side of the tape facing the container, whereby an attempt to remove the tape damages the conductive tracks.

9. The container of claim 6, wherein the container is a bottle and the closure member is a cork.

10. The container of claim 9 in the form of a bottle including a cap enveloping the cork, the neck of the bottle, and the tape, the tape length up to the antenna being selected so that the cap exposes the antenna to electromagnetic fields.

11. A near field magnetically coupled device comprising:
a foldable substrate in the form of a tape having first and second ends attachable to respective separable objects, and configured to rupture when the objects are separated;
an antenna located at the first end of the tape;
a control microcircuit connected to be powered by the antenna, capable of providing full functionality when the antenna is tuned to a nominal frequency, and providing limited functionality when the antenna is tuned to an offset frequency;
a capacitor connected to the antenna, located at the first end of the tape, and configured, when used alone, to tune the antenna to the offset frequency;
an impedance connected to the antenna, located at the second end of the tape, and configured in conjunction with the capacitor to tune the antenna to the nominal frequency; and
conductive tracks running along the tape to connect the impedance to the antenna,
wherein, when the tape is ruptured, the impedance is disconnected from the antenna and the antenna is tuned to the offset frequency.

12. The device of claim 11, wherein the full functionality of the microcircuit includes information reading functions and cryptographic functions, and the limited functionality of the microcircuit is devoid of the cryptographic functions.

13. The device of claim 12, wherein the tape includes breaking points in a central part of the tape.

14. The device of claim 12, wherein the conductive tracks connecting the impedance and the antenna are located on either side of the tape, and are configured as a twisted pair.

* * * * *